S. G. MARTIN.
PROCESS OF EFFECTING OXIDATION OF COPPER.
APPLICATION FILED APR. 17, 1914.
1,164,838.
Patented Dec. 21, 1915.
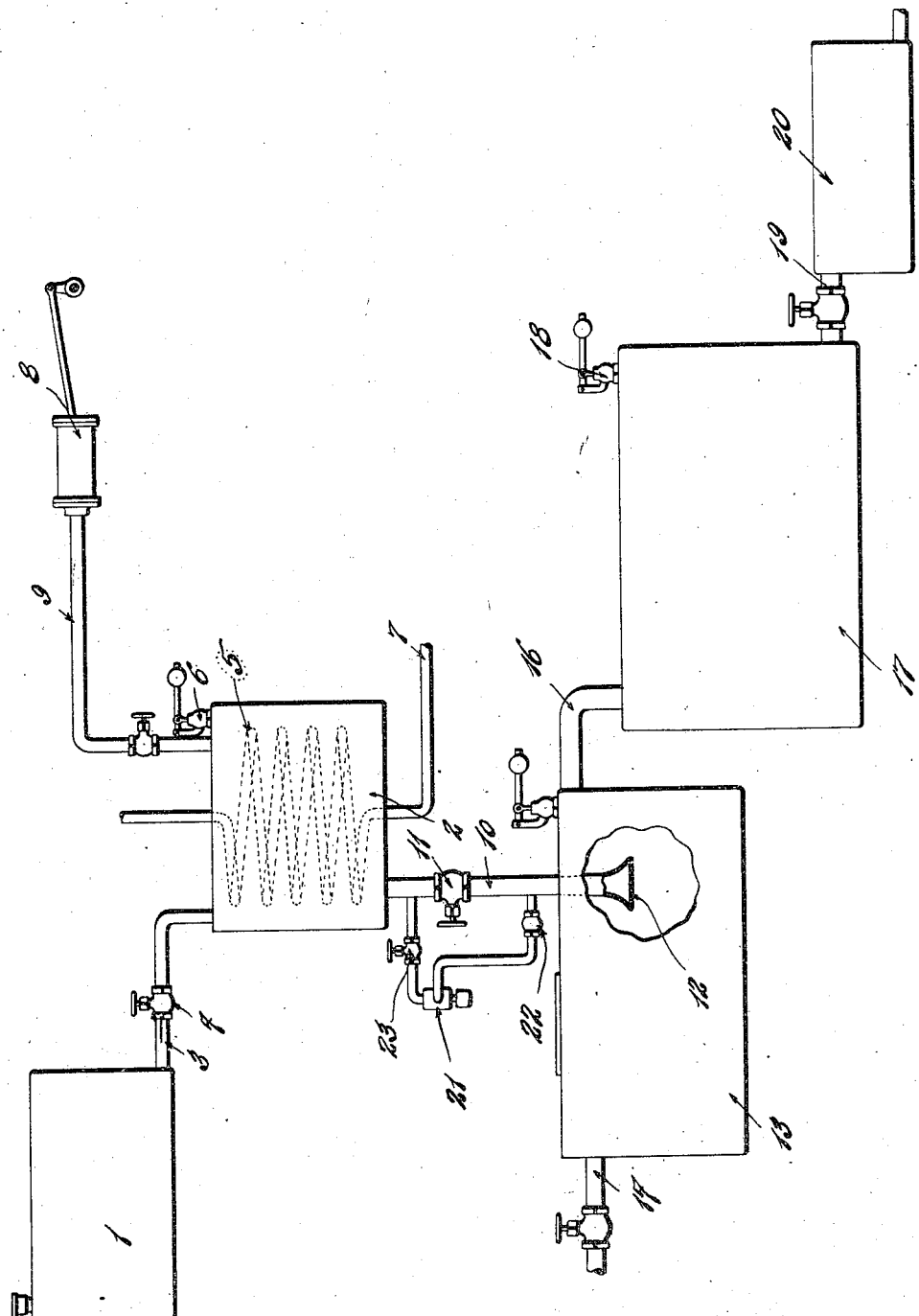

UNITED STATES PATENT OFFICE.

STEPHEN G. MARTIN, OF CHICAGO, ILLINOIS, ASSIGNOR OF ONE-THIRD TO WILLIAM O. BARTHOLOMEW, OF ST. LOUIS, MISSOURI, AND ONE-THIRD TO EDWARD SCHAAF, OF ST. MARYS, MISSOURI.

PROCESS OF EFFECTING OXIDATION OF COPPER.

1,164,838.      Specification of Letters Patent.      Patented Dec. 21, 1915.

Application filed April 17, 1914. Serial No. 832,665.

*To all whom it may concern:*

Be it known that I, STEPHEN G. MARTIN, a citizen of the United States, and resident of Chicago, Cook county, Illinois, have invented certain new and useful Improvements in Processes of Effecting Oxidation of Copper, of which the following is a specification containing a full, clear, and exact description, reference being had to the accompanying drawings, forming a part hereof.

My invention relates to a new and useful process of effecting oxidation of copper, by which method I am enabled to obtain oxid of copper by a process of solution, reaction, heat pressure vaporizing and precipitation.

In carrying out my process I employ a solution of copper, preferably in the form of its sulfate, potassium hydroxid, nitrate of potash, ordinary atmospheric air, and steam. In other words, I take a solution of copper sulfate to which has been added caustic potash, and nitrate of potash, dose this solution with ordinary atmospheric air and subject the dosed solution to a direct impact action of steam, in the manner shown in the accompanying drawings.

In order to describe more clearly my improved process, reference is had to the accompanying drawings, wherein the figure represents in diagram an apparatus capable of carrying out my process.

Referring to the drawing, 1 indicates a supply tank adapted to contain the solution hereinbefore described.

2 indicates a tank into which the solution from tank 1 is passed through pipe 3, in which is located a valve 4 for controlling the passage of solution from tank 1 to tank 2. Located in the tank 2 is a steam coil 5, and a safety valve 6. One end of coil 5 may be attached to any suitable source of steam supply, and the opposite end 7 is the exhaust end of the coil. The steam coil 5 is for heating the solution hereinbefore described.

Ordinary atmospheric air is driven by force pump 8 through pipe 9 into tank 2. Secured to the bottom of the tank 2 is a pipe 10, in which is located a valve 11, and the lower end of the pipe 10 terminates in a perforated head 12, which causes the fluid passing through it to be diffused in a series of small streams or jets.

13 indicates a vaporizing tank, in which the perforated head 12 is located. This tank is of sufficient strength to stand a high degree of pressure, and is suitably lined so as not to be affected by the solution.

Secured to one side of the tank 13 is a pipe 14, said pipe 14 being adapted to be secured to any suitable source of steam supply under pressure, and controlled by a valve 15. Secured to the tank 13 is a pipe 16, one end of which terminates in a condensing chamber 17 provided with a safety valve 18. Attached to the tank 17 is a pipe 19, one end of which terminates in a force filter 20.

The operation of my process is as follows: The solution of copper as hereinbefore described is placed in the tank 1, and this solution is conveyed to the tank 2 and is therein heated to any suitable degree of temperature. While said solution is being heated it is heavily charged or dosed with ordinary atmospheric air through the pipe 9. The air-charged solution is then passed into the pressure tank 13, and if the same does not flow rapidly enough into said tank I may employ a pump 21 to increase the flow. The air-charged solution passes through the perforated head 12 in the form of small jets or sprays, and as it is emitted from said head, steam is admitted into said tank 13 through the pipe 14 under pressure, when decomposition of the copper sulfate into copper oxid is completed according to the following reaction:

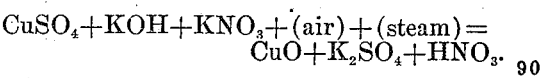
$$CuSO_4 + KOH + KNO_3 + (air) + (steam) = CuO + K_2SO_4 + HNO_3.$$

The products of said reaction together with the vaporized water of the solution are forced over through pipe 16 into the condensing tank 17, and on from the tank 17 through the pipe 19 into the force filter 20, in which filter the copper oxid is secured, by deposit, and the filtrate is discharged through a pipe leading from the filter.

While I have shown one form of apparatus by means of which my process may be carried out, various other forms of apparatus may be designed for carrying out said process.

The essential features of my process are in the employment of a solution containing a mixture of copper sulfate, caustic potash and nitrate of potash, combined with heat, pressure and the precipitation of the salt of copper (cupric oxid) by a condensation.

For the purpose of my process I do not limit myself to the use of potassium hydroxid, and potassium nitrate, but may employ in their stead equivalents of the same, and I may also employ a soluble salt of copper other than the sulfate of my preferred solution. However, for purposes of general economy and expediency, I prefer to make use of the solution first described in this application.

The pump 21 may be used for forcing the solution from the tank 2 into the vaporizing chamber 13, the back pressure being controlled by means of a check valve 22, and the passage of the solution to the pump being controlled by means of a valve 23.

I claim:

1. The herein described process of effecting oxidation of copper, which consists in taking a solution containing a salt of copper, hydroxid of potassium and nitrate of potassium, heating said solution and charging the heated solution with atmospheric air.

2. The herein described process of effecting oxidation of copper, which consists in taking a solution containing a salt of copper, hydroxid of potassium and nitrate of potassium, charging said solution with atmospheric air, and subjecting the charged solution to the action of steam under pressure.

3. The herein described process of effecting oxidation of copper, which consists in taking a heated solution of a salt of copper, hydroxid of potassium and nitrate of potassium, charging said solution with ordinary atmospheric air and subjecting the charged solution to the action by direct impact, of steam under pressure.

In testimony whereof, I have signed my name to this specification, in presence of two subscribing witnesses.

STEPHEN G. MARTIN.

Witnesses:
J. GUTHRIDGE,
O. C. BOWERS.